J. SLADE.
CAR-COUPLING.
No. 182,136. Patented Sept. 12, 1876.
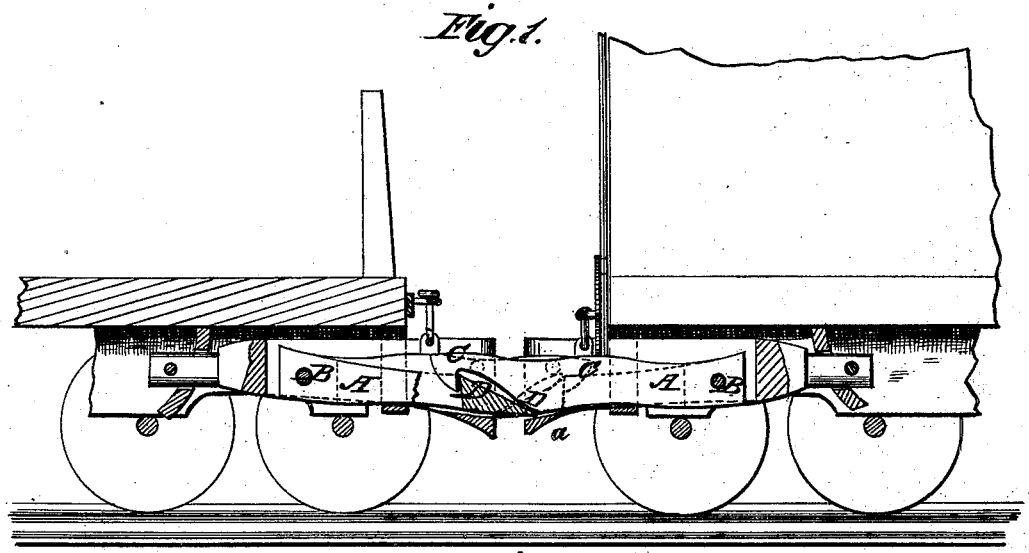
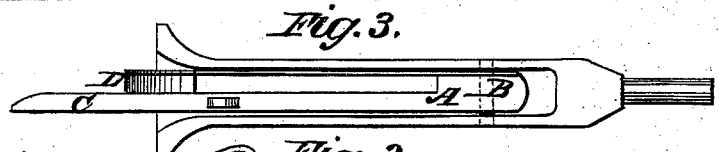
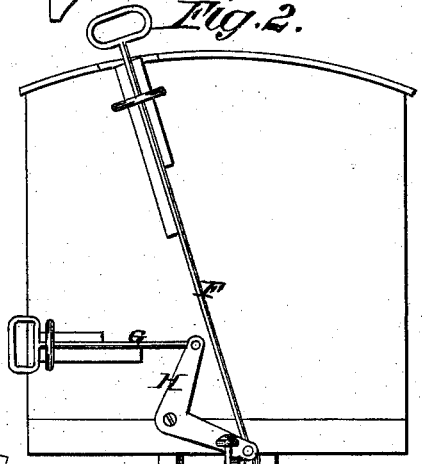
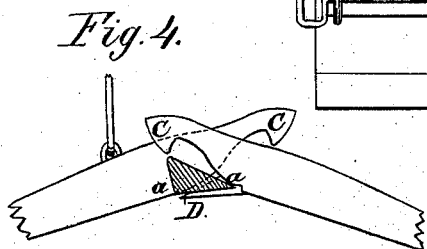
WITNESSES:
Francis McArdle,
John Goethals
INVENTOR:
J. Slade
BY
ATTORNEYS.
N. PETERS, PHOTO-LITHOGRAPHER, WASHINGTON, D. C.

UNITED STATES PATENT OFFICE.

JOHN SLADE, OF BAY CITY, MICHIGAN.

IMPROVEMENT IN CAR-COUPLINGS.

Specification forming part of Letters Patent No. 182,136, dated September 12, 1876; application filed January 29, 1876.

*To all whom it may concern:*

Be it known that I, JOHN SLADE, of Bay City, in the county of Bay and State of Michigan, have invented a new and Improved Car-Coupling, of which the following is a specification:

The invention is an improvement in the class of car-couplings whose chief elements are pivoted hooks, arranged to couple automatically.

The invention relates particularly to the form of the shank of the hooks, and to the provision of beveled blocks, attached to the side of the hooks, whereby the latter are adapted to be uncoupled when raised to a slight angle, as hereinafter described.

Figure 1 is a longitudinal sectional elevation of a couple of cars coupled with my improved coupling; Fig. 2, an end elevation of one of the cars, and Fig. 3 a plan of one of the couplings; Fig. 4, a detail view representing the hooks in the act of disengaging.

A represents the couplings, which are pivoted in the draw-bars at B, and each provided with a hook, C, and a catch, D, for coupling with the other. The catch D is a triangular or beveled block, and is attached to or formed solid on the side of the coupling-bar. When the couplers come together the hooks ride up on the catches and fall behind them for coupling, as shown in Fig. 1, the hook of one coupler being opposite to, or in the plane of, the catch of the other. The shank of each hook has a projection at *a*, on the under side, contiguous to the recess in the hook proper. In consequence of this form of the hooks and the provision of the beveled block D on the side of each, they are adapted to uncouple whenever raised to an angle of about thirty or thirty-five degrees, as in Fig. 4. In such case the projection *a* bears upon the end of the block D on the opposite hook, and frees its own hook from the block by the leverage thus exerted. It is apparent that the raising of either hook causes the other to be raised also. F is a rod for uncoupling from the top of a freight-car, and G is a rod, and H a bell-crank, for uncoupling from the side; but these can be contrived in any approved way.

What I claim is—

The coupling-hooks, constructed as shown, each having the projection *a* on the under side, and the beveled block D, attached contiguously to the side thereof, in combination with the recessed draw-heads, as shown and described, to operate as specified.

JOHN SLADE.

Witnesses:
JOHN McCLELLAN,
SAMUEL SHOOP.